US007768630B2

(12) United States Patent
Sarchi et al.

(10) Patent No.: US 7,768,630 B2
(45) Date of Patent: Aug. 3, 2010

(54) METHOD AND APPARATUS FOR THE EVALUATION OF POLARIZATION MODE DISPERSION IN OPTICAL FIBERS

(75) Inventors: Davide Sarchi, Milan (IT); Martino Travagnin, Milan (IT); Alexis Debut, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 947 days.

(21) Appl. No.: 10/572,203

(22) PCT Filed: Sep. 14, 2004

(86) PCT No.: PCT/EP2004/052166

§ 371 (c)(1),
(2), (4) Date: Oct. 30, 2006

(87) PCT Pub. No.: WO2005/060130

PCT Pub. Date: Jun. 30, 2005

(65) Prior Publication Data

US 2007/0189656 A1      Aug. 16, 2007

(30) Foreign Application Priority Data

Sep. 19, 2003    (WO)    ............ PCT/EP03/10467

(51) Int. Cl.
    *G01N 21/00*    (2006.01)
(52) U.S. Cl. .................. 356/73.1; 385/11; 385/15; 385/39; 385/134
(58) Field of Classification Search .......... 356/73.1; 385/11, 15, 27, 39, 100–134
See application file for complete search history.

(56) References Cited

U.S. PATENT DOCUMENTS 4,224,094 A * 9/1980 Amicel et al. ............ 156/169

(Continued)

FOREIGN PATENT DOCUMENTS

WO        WO 02/32023 A1        4/2002

OTHER PUBLICATIONS

Karlsson, "Probability Density Functions of the Differential Group Delay in Optical Fiber Communication Systems", Journal of Lightwave Technology, IEEE., New York, US., vol. 19, No. 3, XP002279549, pp. 324-331, (2001).

(Continued)

*Primary Examiner*—Gregory J Toatley, Jr.
*Assistant Examiner*—Iyabo S Alli
(74) *Attorney, Agent, or Firm*—Finnegan, Henderson, Farabow, Garrett & Dunner, L.L.P.

(57) ABSTRACT

A method of evaluating the Polarization Mode Dispersion (PMD) of an optical fiber by arranging the optical fiber at substantially zero tension on a surface, propagating prescribed evaluation optical signals along the optical fiber, measuring fiber Differential Group Delay (DGD) values in response to the evaluation optical signals, repeating at least once the acts of propagating and measuring, each time preliminarily inducing a change in a mode coupling of the fiber, and determining the fiber PMD on the basis of a calculated DGD average value. Changes in the polarization mode coupling of the fiber are induced by, moving at least a section of the fiber substantially orthogonally to the surface. An improved PMD evaluation apparatus includes a fiber arrangement surface adapted to have a fiber under test arranged thereon at substantially zero tension, and, operatively associated with the fiber arrangement surface, a fiber moving device activatable for moving the at least a section of the fiber substantially orthogonally to the fiber arrangement surface.

26 Claims, 9 Drawing Sheets

U.S. PATENT DOCUMENTS

| 6,020,584 | A | 2/2000 | Brarens et al. |
| 6,704,100 | B2* | 3/2004 | Sengupta et al. ........... 356/73.1 |
| 2004/0027559 | A1 | 2/2004 | Sengupta et al. |
| 2004/0084611 | A1* | 5/2004 | Chen et al. .................. 250/225 |

OTHER PUBLICATIONS

Allen, et al., "Measured Temporal and Spectral PMD Characteristics and Their Implications for Network-Level Mitigation Approaches", Journal of Lightwave Technology, vol. 21, No. 1, pp. 79-86, (2003).

Walker, "Fibers and Cables for Ultralow PMD", WJ4, Proceedings of OFC 2003, pp. 4-5, (2003).

Ulrich, et al., "Bending-induced birefringence in single-mode fibers", Optics Letters, vol. 5, No. 6, pp. 273-275, (Jun. 1980).

Perrot, IEC Standard 86A/658 NP (based on Proposal IEC 60793-1-48, "Polarisation mode dispersion measurement methods"), pp. 1-55, (2001).

* cited by examiner

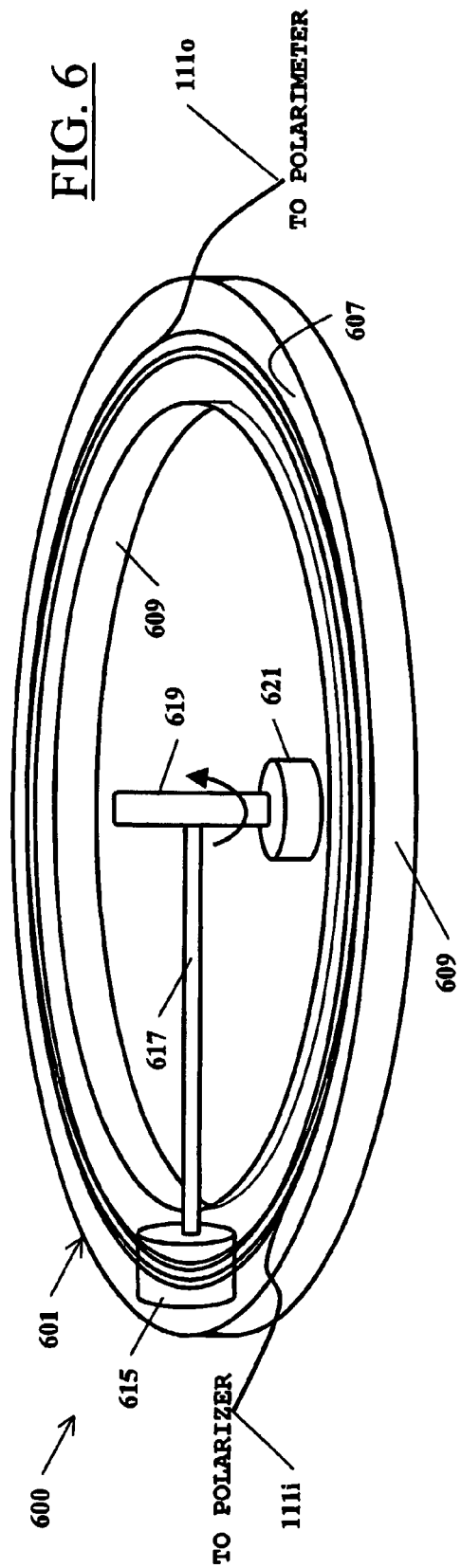
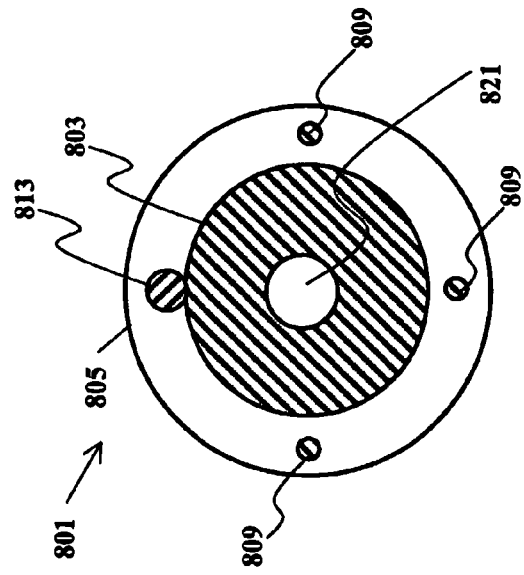
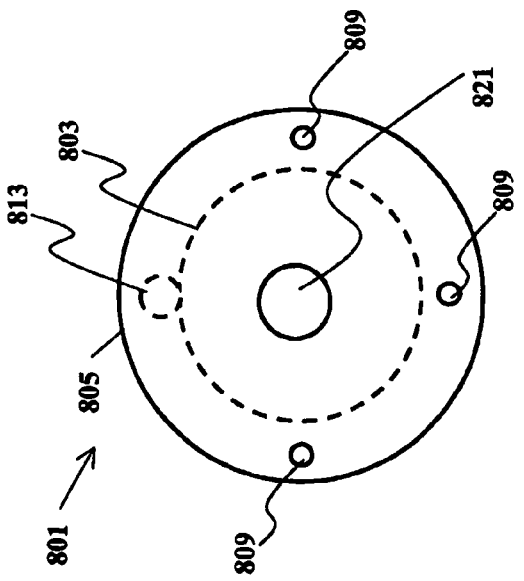

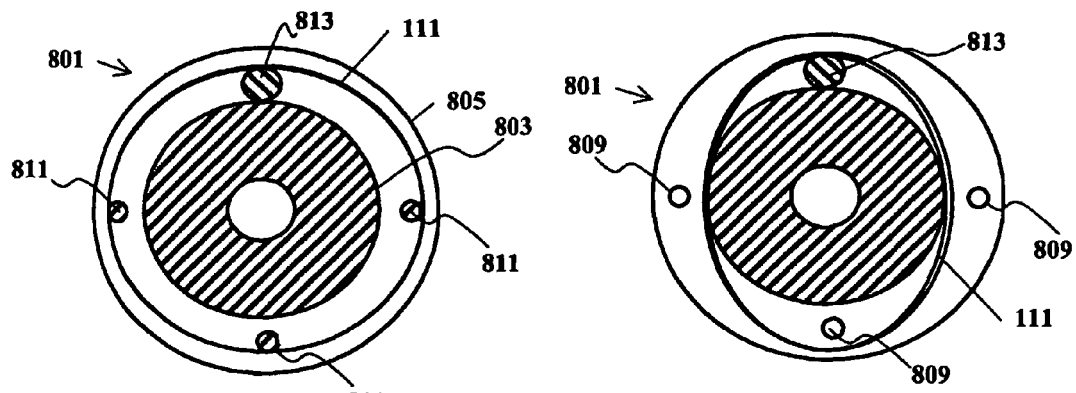
FIG. 9
FIG. 10
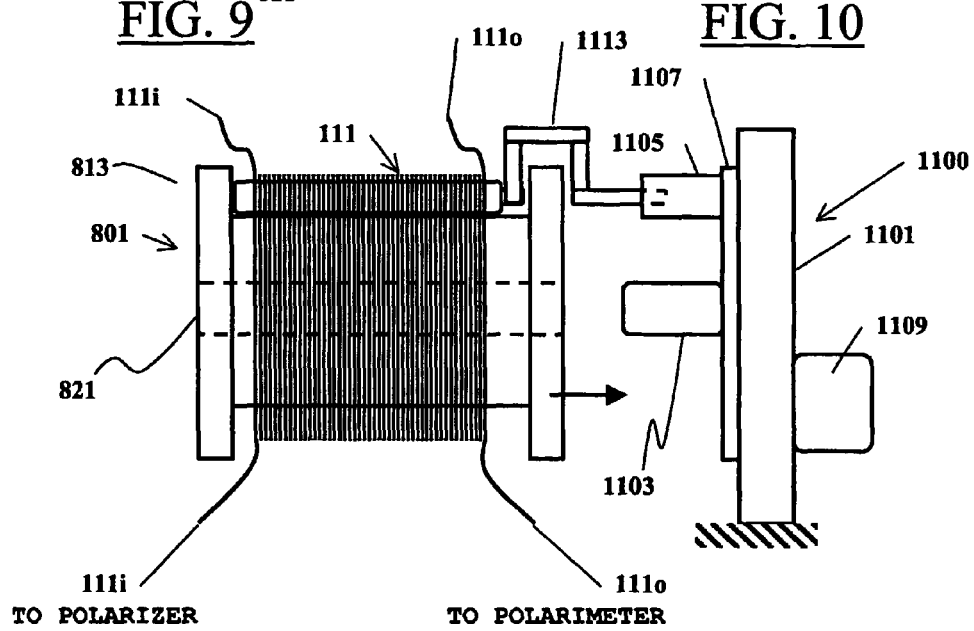
FIG. 11A
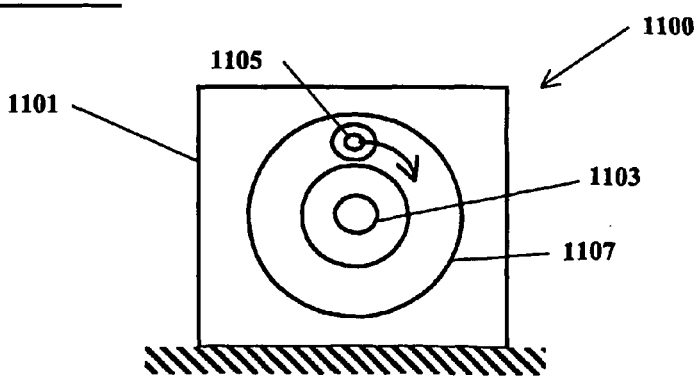
FIG. 11B

METHOD AND APPARATUS FOR THE EVALUATION OF POLARIZATION MODE DISPERSION IN OPTICAL FIBERS

CROSS REFERENCE TO RELATED APPLICATIONS

This application is a national phase application based on PCT/EP2004/052166, filed Sep. 14, 2004, the content of which is incorporated herein by reference, and claims the priority of PCT/EP03/10467, filed Sep. 19, 2003, the content of which is incorporated herein by reference.

BACKGROUND OF THE INVENTION

1. Field of the Invention

The present invention generally relates to optical fibers. In particular, the invention concerns methods for evaluating optical fibers characteristic parameters, and, more specifically, methods for evaluating the Polarization Mode Dispersion (hereinafter, PMD) of optical fibers.

2. Description of the Related Art

In the field of optical fibers manufacturing, the PMD is an important parameter to be evaluated, because it is related to the communication rate that an optical fiber can sustain.

The PMD relates to the polarization-pendent group velocities of optical signals propagating through the fiber. This phenomenon, which is a consequence of the optical fiber birefringence, causes optical pulses to spread in the time domain as they propagate along the fiber, because different polarization components of the optical pulse have different arrival times.

The spread of optical pulses poses limit to the communication bit rate, and a proper evaluation of the PMD of optical fibers is thus important in order to determine the maximum allowable data rate in an optical communication system in which the optical fibers are exploited. In a world in which there is an increasing demand for bandwidth, this is of paramount importance.

It is known in the art that the PMD in an optical fiber is a statistical parameter. The statistical nature of the PMD in optical fibers is for example recognized in the IEC Standard 86A/658/NP (based on the Proposal IEC 60793-1-48 entitled "Polarisation mode dispersion measurement methods"). Such document sets a standard and provides uniform methods of measuring the PMD of optical fibers and optical fiber cables; for this reason, the document will be hereinafter concisely referred to as the IEC standard, and the content thereof is to be considered as incorporated herein by reference.

In the IEC standard there is explained that (for a sufficiently narrow band optical source) the effect that gives rise to the PMD can be related to a Differential Group Delay (shortly, DGD, a quantity usually measured in ps) between pairs of orthogonally polarized principal states of polarization at a given wavelength; in long fiber spans, the DGD is random in both time and wavelength, since it depends on the details of the birefringence along the entire fiber length, and it is also sensitive to temperature and mechanical perturbations on the fiber. A useful way to characterize the PMD in long fibers is thus in terms of the expected value (or the mean value) of the DGD over wavelength.

The IEC standard provides three basic methods for measuring the PMD, namely: the fixed analyzer method (Method A), the Stokes parameter evaluation method (Method B) and the interferometry method (Method C). Methods A and B both call for evaluating the PMD by measuring a response to a change of narrowband light across a wavelength range; Method C, intended for evaluating the PMD of installed optical fiber cables (that may be moving or vibrating) is based on a broadband light source that is linearly polarized.

The IEC standard prescribes that, in case of disputes, Method B is to be taken as the reference PMD evaluation method. Summarizing, in Method B a light source is coupled to the fiber under test and the fiber output is coupled to a polarimeter, used for measuring the output Stokes vectors for each selected input polarization and wavelength. The wavelengths are scanned across a range appropriate for the operative wavelength region and the desired precision, and with a suitably small wavelength increment. The measurement data are gathered for each wavelength.

Different approaches for performing calculations on the gathered measurement data are possible (Jones Matrix Eigenanalysis—JME—, Poincaré Sphere Analysis —PSA— or State Of Polarization—SOP), all approaches resulting in a distribution of DGD values across the wavelength range.

A fiber is said to be in random mode coupling regime when it is longer than few hundreds meters, perturbed by external sources randomly distributed along its length, each perturbation site changing locally the state of polarization without altering significantly the intrinsic fiber birefringence; by mode coupling there is intended the energy transfer between the different polarization modes within the fiber. In the ideal case of random mode coupling within the fiber under evaluation, the distribution of the DGD values obtained by varying the wavelength is a Maxwell curve. The mean value of the DGD distribution is by definition the fiber PMD (which is therefore usually measured in ps). Since the PMD increases as the square root of the fiber length in the random mode coupling regime, it is common practice to derive from the fiber PMD a coefficient $PMD_c$ defined as the fiber PMD divided by the square root of the length of the fiber under test. The coefficient $PMD_c$ is measured in ps/sqrt(km).

In order to achieve a Maxwell distribution, a wide wavelength range should be used (typically hundreds of nanometers), so as to measure many DGD values. This wide range is often impractical for the limited width of spectral sources. For this reason, the same curve is obtained varying randomly the spatial distribution of the perturbation on the fiber under test. For example, in the IEC standard, Annex E, strategies for improving precision are set forth, suitable to achieve a distribution of measured DGD values better matching the ideal Maxwell distribution, and thus a better evaluation of the fiber PMD. One of these strategies calls for merging data obtained by performing repeated DGD measurements on the optical fiber, changing the mode coupling of the fiber between the different measurements.

One proposed way for changing the fiber mode coupling calls for varying the temperature of the fiber through the different DGD measurements. In the case of already-installed optical fiber cables, the daily ambient temperature change can be expediently exploited, by properly timing the different measurements, as demonstrated by C. T. Allen et al. in the technical paper "Measured Temporal and Spectral PMD Characteristics and Their Implications for Network-Level Mitigation Approaches", Journal of Lightwave Technology, Vol. 21, No. 1, p. 79-86 (January 2003).

Another way to change the fiber mode coupling in case the fiber to be tested is loosely spooled on a spool calls for rearranging the fiber on the spool by making the spool vibrate, turning the spool upside down or massaging the fiber by hand.

The Applicant has observed that the perturbation of the fiber is critical: it is necessary to find a good method of modifying the fiber configuration in order the alter the evolution of polarization states, without modifying the original fiber birefringence.

In this respect, the IEC standard also sets general prescriptions for carrying out the measurements directed to evaluating the PMD, valid independently of the method adopted. In particular, it is recognized that the deployment of the optical fiber can influence the result; thus, the optical fiber deployment should be selected so as to minimize any externally-induced mode coupling (i.e., any externally-induced birefringence). The IEC standard points out that sources of such externally-induced mode coupling can be an excessive fiber tension, an excessive fiber bending, induced from fiber crossovers on a shipping reel and/or crimping of fiber within a cable on a spool that is too small and/or too small a bend radius (concerning the effects of fiber bending on the fiber birefringence, see for example R. Ulrich et al., "Bending-induced birefringence in single-mode fibers", Optics Letters, Vol. 5, No. 6, p. 273-275, (June 1980)), an excessive twist of the fiber.

For these reasons, the IEC standard prescribes that the fiber under evaluation is to be kept at a minimal tension either by deploying the fiber in loops on a flat smooth surface (e.g., the floor of a test room), or by loosely wrapping the fiber onto a spool having a smooth surface; the IEC standard also sets a prescribed minimum smoothness, corresponding to that of paper of grade 88 gsm. In either case, according to the IEC standard, the fiber is to be deployed without crossing over itself, and with a bend radii in excess of 15 cm.

The former type of fiber deployment, which in jargon is referred to as the "floor test" deployment, allows closely matching the conditions that the optical fiber under testing will encounter in the normal operating environment (i.e., in an optical cable). For example in K. Walker, "Fibers and cables for Ultralow PMD", WJ4, Proceedings of OFC 2003, it is shown that there is a good correspondence between $PMD_c$ when measured in cables and "in large coils on a floor".

The second fiber deployment, also referred to as the "low-tension bobbin" deployment, is more suitable than the floor test deployment in view of an industrial, mass-scale fiber production.

The Applicant observes that the known methods of changing the fiber mode coupling are time consuming and error-prone, so they are hardly compatible with the necessity of performing, in an industrial environment, repeated DGD measurements in different fiber configurations for achieving a precise evaluation of the PMD.

In particular, in the floor test deployment, after each DGD measurement, one or more human operators are required for slightly modifying manually the fiber deployment.

In the low-tension bobbin deployment, when one tries to rearrange the fiber on the spool by vibrating the spool or repeatedly turning the spool upside-down, or by manually massaging the fiber, so as to change the fiber configuration, it turns out that the fiber is normally not loose enough to obtain the desired Maxwell distribution of DGD measured values.

Besides, the Applicant observes that the operation of wrapping an optical fiber to be tested around a spool (i.e., spooling the optical fiber to be tested) with a minimal tension not to affect the measures to be conducted may pose some problems. In particular, the fiber spooling process is rather time consuming, because the fiber spooling speed needs to be kept low in order to keep the fiber tension under tight control. So, this process cannot be repeated many times on the same fiber to obtain a good Maxwell distribution.

A different way to evaluate the PMD statistics calls for performing a limited number of DGD values measurements on a limited wavelength range for a given fiber, evaluating the coefficient $PMD_c$ thereof, then repeating the operation for different fibers of a same production lot, i.e., fibers produced by the same manufacturing process. If all the $PMD_c$ coefficients derived for the different fibers are represented in the same distribution, a characterization of the overall fiber manufacturing process from the PMD viewpoint is obtained.

The Applicant observes that, even if this procedure to obtain a PMD statistical description does not require perturbing the fiber configuration, it is in any case mandatory to choose a deployment that avoids any alteration of the fiber intrinsic birefringence.

In the U.S. Pat. No. 6,020,584 a method for measuring the PMD of a chromatic dispersion compensating optical fiber is described, according to which a plurality of PMD values is obtained. A length of the fiber is wound under a tension around a rigid center hub of a spool, in radially outward overlapping layers; the fiber tension is in the range of 40 to 80 grams, preferably at least 50 grams, in order to provide a packing fraction greater than about 0.7, more preferably greater than about 0.8, and most preferably at least 0.85. Then, a force is applied to the flanges of the spool proximate to an outermost layer of wound optical fiber, to urge the two flanges together, so as to squeeze the optical fiber between the flanges and radially outward from the center hub. The force is then relieved, and the fiber PMD is measured and recorded. The steps of applying the force, relieving the force and measuring the fiber PMD are repeated so as to obtain a plurality of post mechanically perturbed PMD measurement values.

The Applicant observes that the method disclosed in U.S. Pat. No. 6,020,584 does not comply with the IEC standard prescriptions concerning the minimisation of externally-induced mode coupling, because the fiber is subjected to a non-negligible tension, due to the fact that the fiber is not loosely wrapped on the spool, rather it is wound around the spool under a tension in the range of 40 to 80 grams. Also, it may be expected that the fiber tension increases as a result of the repeated squeezes to which it is subjected, with the result that the measured PMD values hardly reproduce the Maxwell distribution corresponding to the substantially zero tension measurement, contrarily to what desired.

In view of the state of the art outlined in the foregoing, it has been an object of the present invention to improve the known methods for evaluating the PMD in optical fibers.

In particular, the Applicant has observed that most of the PMD evaluation methods and apparatuses known in the art do not allow performing an evaluation of the PMD in an optical fiber that takes into due account the statistical nature of the PMD. The Applicant has also observed that the lack of a real statistical description reduces the measurement accuracy, making it impossible to properly point out the effects of the different possible fiber deployments on the intrinsic birefringence. The method disclosed in U.S. Pat. No. 6,020,584 fails to provide the desired statistical description, because the PMD measurements are biased by externally-induced mode coupling caused by the fiber tension.

SUMMARY OF THE INVENTION

The Applicant has devised a method and an apparatus by which the placement of an optical fiber whose PMD is being evaluated is such that externally induced mode coupling is minimized, and such a placement can be changed automatically in order to obtain the theoretically expected Maxwell distribution, at the same time without subjecting the fiber to disturbances that might affect the intrinsic birefringence thereof, such as for example tensile stresses, compression stresses, lateral pressure, bending of the fiber.

According to a first aspect of the present invention, there is proposed a method of evaluating the PMD of an optical fiber as set forth in claim 1.

Summarizing, the method comprises:

arranging the optical fiber at a substantially zero tension, on a surface;

propagating prescribed evaluation optical signals along the optical fiber;

measuring fiber Differential Group Delay (DGD) values in response to said evaluation optical signals;

repeating at least once said acts of propagating and measuring, each time preliminarily inducing a change in a mode coupling of the fiber; and determining the fiber PMD on the basis of a calculated DGD average value.

The act of inducing a change in the polarization mode coupling of the fiber comprises moving at least a section of the fiber substantially orthogonally to the surface on which the fiber is arranged at substantially zero tension.

It is observed that, for the purposes of the present invention, by substantially zero tension it is intended that the optical fiber is arranged, e.g. deployed on the surface loosely, in a relaxed, unstressed condition, particularly a condition ensuring that the externally induced mode coupling is minimized. Substantially zero tension may mean a fiber tension less than approximately 20 grams, preferably less than approximately 10 grams, more preferably less than approximately 0.15 grams (as in the case the only source of tension in the fiber is its weight).

Preferably, the at least a section of the fiber which is moved substantially orthogonally to the surface is variable along the fiber.

In an embodiment of the present invention, the surface on which the fiber is arranged is a substantially planar surface. The act of arranging the optical fiber on a surface may comprise arranging the fiber in a plurality of substantially rectilinear fiber sections joined by at least partially curved fiber sections having a curvature radii higher than a minimum curvature radii, an overall length of the substantially rectilinear sections being substantially higher than an overall length of the at least partially curved fiber sections. In particular, the act of arranging the fiber in a plurality of substantially rectilinear fiber sections may comprise arranging the fiber on the surface in a generally "0" shaped arrangement, with two laterally-spaced arrangements of substantially-rectilinear fiber sections.

The act of moving the at least a section of the fiber substantially orthogonally to the surface on which it is arranged preferably comprises lifting at least a portion of at least a group of the substantially rectilinear fiber sections with respect to the surface, and lowering the lifted portion back. Preferably, consecutive spans of the substantially rectilinear fiber sections in at least one of the two laterally-spaced arrangements of substantially rectilinear fiber sections are lifted and lowered back in succession.

Alternatively, the act of arranging the optical fiber on a surface may comprise arranging the fiber in circles having a curvature radii higher than a minimum curvature radii.

According to still another alternative, the surface on which the fiber is arranged is a curved surface, particularly a generically cylindrical surface, having a radial dimension of at least approximately 30 cm.

In particular, the acts of arranging the optical fiber on a surface may comprise:

providing a bobbin with a fiber spooling surface having a radial dimension variable in a controlled way between a first, greater radial dimension and a second, lower radial dimension;

spooling the fiber on the bobbin while the spooling surface has the first radial dimension; and reducing the radial dimension of the spooling surface to the second diameter, so that the fiber is rendered loose, particularly so that the fiber tension is rendered substantially zero (in the sense defined above).

According to another aspect of the present invention, there is provided an apparatus as set forth in claim 12, to be used in a process of evaluation of an optical fiber PMD, for automatically inducing changes in a fiber mode coupling.

In brief, the apparatus comprises a fiber arrangement surface adapted to having arranged thereon the fiber under evaluation at substantially zero tension (in the sense defined above), and, operatively associated with the fiber arrangement surface, a fiber moving device activatable for moving at least a section of the fiber substantially orthogonally to the fiber arrangement surface.

The fiber moving device may comprise a fiber moving member movable with respect to the fiber arrangement surface, for moving sections of the fiber in variable positions along the fiber.

Preferably, the fiber moving member is adapted to move in succession different sections of the fiber.

In one embodiment of the invention, the fiber arrangement surface is a substantially planar surface. The fiber moving member may be adapted to lift the at least a section of the fiber with respect to the fiber arrangement surface, and to lower the lifted fiber section back.

Alternatively, the fiber arrangement surface is a curved surface, particularly a generically cylindrical surface, and has a radial dimension of at least approximately 30 cm.

The apparatus may comprise a bobbin with a fiber spooling surface having radial dimension variable in a controlled way between a first, greater radial dimension and a second, lower radial dimension, a difference between the first radial dimension and the second radial dimension being such that a reduction of radial dimension causes a fiber spooled on the bobbin while the bobbin has the first radial dimension to be rendered sufficiently loose for enabling the fiber moving arrangement move the at least a section of the fiber. In particular, the reduction of radial dimension is such as to ensure that the tension in the fiber is substantially zero (in the sense defined above).

Using the method and apparatus described above, the Applicant has been able to characterize the PMD of fibers with a high degree of accuracy (with respect to the expected cable conditions), obtaining a complete statistical description of PMD effect. This high accuracy allowed the Applicant comparing, from the viewpoint of the accuracy of the PMD evaluation, different fiber deployments, equipollent to the floor test deployment in terms of PMD statistics, but industrially more convenient than the floor test deployment because of the limited space required.

BRIEF DESCRIPTION OF THE DRAWINGS

The features and advantages of the present invention will be made apparent by the following detailed description of some embodiments thereof, provided merely by way of non-limitative examples, description that will be conducted making reference to the attached drawings, wherein;

FIG. 6 shows very schematically and in perspective an apparatus for automatically inducing changes in an optical fiber mode coupling by modifying the fiber physical disposition according to an alternative embodiment of the present invention, still adapted to be used in the floor test deployment PMD evaluation method, with the optical fiber deployed in circles instead that in substantially rectilinear sections;

FIGS. 8A, 8B and 8C schematically show one lateral view, one front view and one cross-sectional view (along the line VIII-VIII) of a variable-diameter bobbin adapted to be used in a substantially zero-tension bobbin deployment PMD evaluation method according to an embodiment of the present invention;

FIGS. 9 and 10 schematically depict the usage of the variable-diameter bobbin of FIGS. 8A, 8B and 8C in the substantially zero-tension bobbin deployment PMD evaluation method according to an embodiment of the present invention;

FIGS. 11A and 11B are two schematic views of an apparatus according to an embodiment of the present invention, adapted to be used in combination with the variable-diameter bobbin of FIGS. 8A, 8B and 8C for performing the substantially zero-tension bobbin deployment PMD evaluation method;

DETAILED DESCRIPTION OF THE INVENTION

Figure 1:
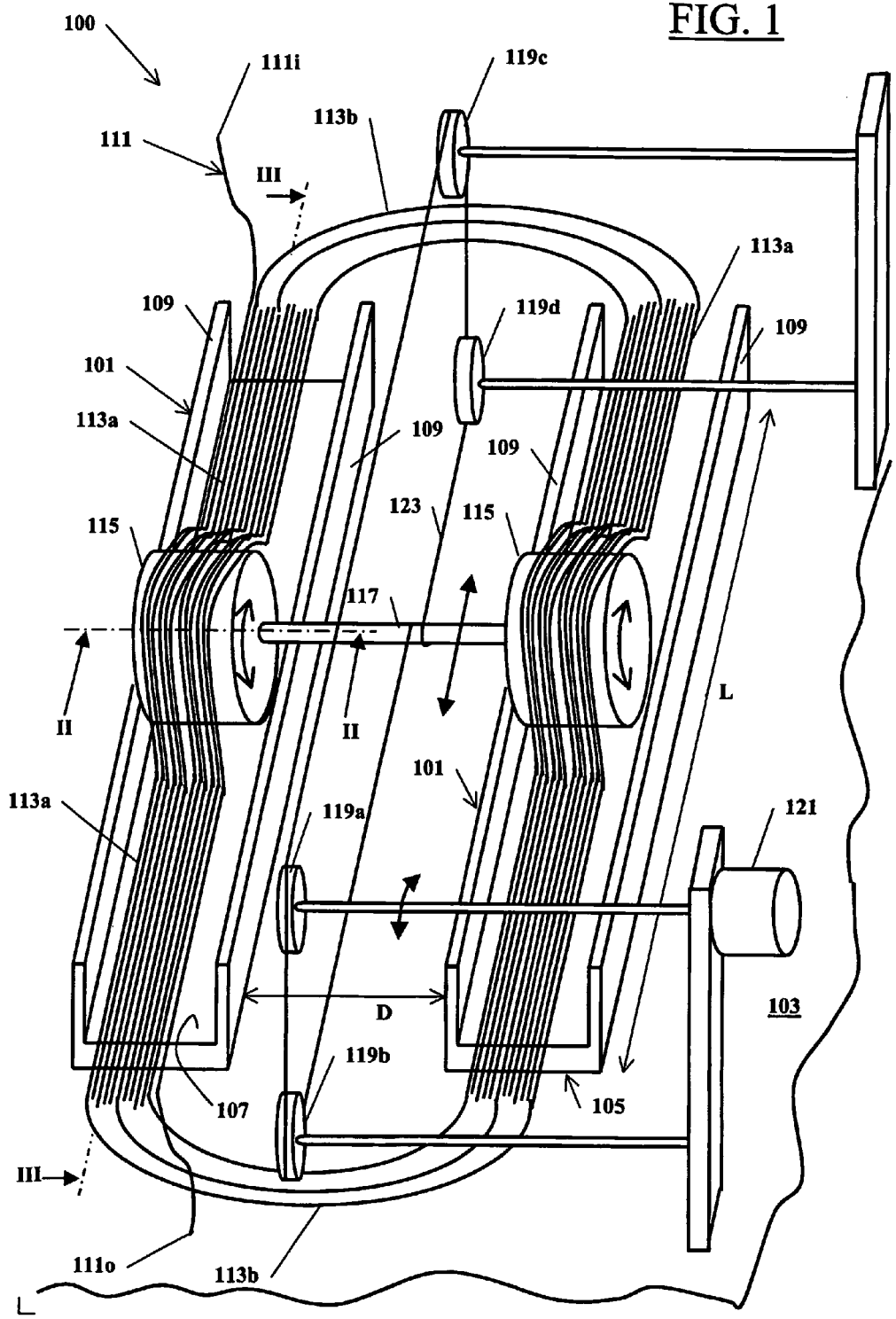
FIG. 1 is a schematic, not in scale assonometric view of an apparatus according to a first embodiment of the present invention, for automatically inducing changes in an optical fiber polarization mode coupling by modifying the fiber physical disposition, the apparatus being particularly adapted to be used in a PMD evaluation method based on the floor test deployment.
Figure 2:
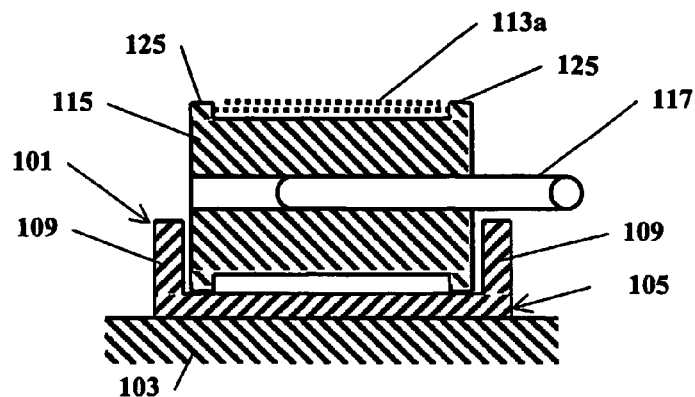
FIG. 2 schematically shows a sectional view along the line II-II of the apparatus of FIG. 1.
Figure 3:
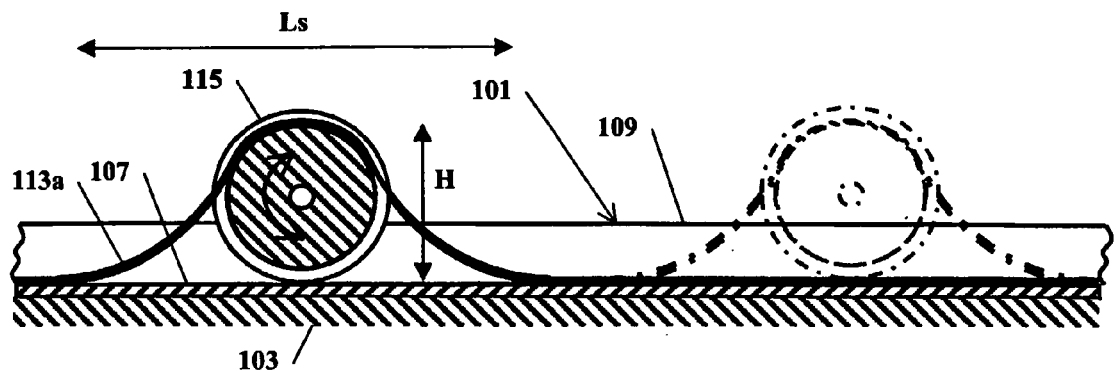
FIG. 3 schematically shows a sectional view along the line III-III of the apparatus of FIG. 1.

With reference to the drawings, and particularly to FIGS. 1, 2 and 3, an apparatus according to a first embodiment of the present invention is schematically shown, for automatically inducing changes to the polarization mode coupling of an optical fiber during a process of evaluation of the fiber PMD.

The apparatus, globally identified as 100, comprises a pair of substantially rectilinear ducts 101, of substantially equal length L, arranged on a support surface 103 (for example, the floor of a measurement environment) so as to extend side by side and substantially parallel to each other in a first direction, and spaced apart of a distance D in a second direction, transverse, in particular orthogonal, to the first direction.

Each duct 101 has a bottom wall 105, intended to be placed in contact to the support surface or floor 103; the bottom wall 105 has a substantially flat upper surface 107; in particular, as prescribed in the IEC standard cited in the introductory part of the present description, the surface 107 has a smoothness equivalent to or better than that of a sheet of paper of grade 88 gsm.

Each duct 101 also includes a pair of laterally-spaced, lateral containment walls 109, substantially coextensive to the duct itself, rising from the bottom wall 105 and defining a channel therebetween, in the shown, non-limitative example having substantially constant width.

The two ducts 101 are used to deploy an optical fiber 111 whose PMD is to be evaluated; in particular, the optical fiber 111 is deployed along the two channels defined by the lateral walls 109 of the two ducts 101, lying on the surface 107 of the duct bottom wall 105, so as to form a plurality of turns, with a plurality of substantially rectilinear optical fiber sections 113a, extending substantially rectilinearly along each duct 101 in said first direction, joined by at least partially curved fiber sections 113b extending between the two ducts 101 generically in said second direction.

The lateral walls 109 of the ducts 101 allows laterally containing the substantially rectilinear sections 113 of the deployed optical fiber 111, which are therefore kept within the two channels.

In an embodiment of the present invention, the length L of the ducts 101 is chosen to be approximately of the same order of the fiber beat length $L_B$. Typically, the beat length $L_B$ of an optical fiber is in the range from 1 m to 50 m; the length L of the ducts 101 is for example chosen to be approximately 10 m.

The distance D between the two ducts 101 is chosen in dependence of the desired bending radius of the curved sections 113b of the optical fiber 111 that joins the substantially rectilinear sections 113a in the two ducts 101. In particular, such a bending radius is to be kept sufficiently large, not to affect the result of the measurements to be carried out on the fiber. A suitable distance D is for example approximately 1 m, resulting in a bending radius of approximately 50 cm.

Considering that the optical fiber 111 may have a typical length of the order of one kilometer or more, it can be appreciated that most of the deployed fiber 111 lies in the ducts 101.

In an embodiment of the present invention, the two ducts 101 may be joined at their ends by curved support segments, for supporting the curved sections 113b of the optical fiber. Otherwise, the curved sections 113b may be laid directly on the support surface or floor 103.

The apparatus 100 further comprises a device for lifting the optical fiber rectilinear sections 113a with respect to the surface 107 of the bottom wall 105 of the ducts 101. In the shown embodiment of the invention, the fiber lifting device comprises a pair of rollers 115, each one associated with a respective one of the two ducts 101 and, more particularly, movably housed in the channel defined by the pair of lateral walls 109 of the respective duct 101.

The two rollers 115 are (in the shown embodiment, jointly) movable fro and back along the ducts 101. A roller drive device comprises an axle 117, joined at the two ends thereof to the two rollers 115, and a cable transmission comprising a cable 123 wound around a quadrilateral arrangement of four pulleys 119a, 119b, 119c and 119d, arranged by pairs 119a, 119b and 119c, 119d, each pair of pulleys being located substantially at a respective one of the two ends of the ducts 101. One 119a of the pulleys is an active or drive pulley, driven for example by a motor 121; alternatively, the motor 121 may be replaced by a hand-driven handle, adapted to being driven by a human operator; the remaining three pulleys 119b, 119c and 119d are idle. The cable 123 is wound at least once around the axle 117, thereby the movement of the cable 123 caused by the action of the drive pulley 119a determines the roto-translation of the axle 117 in the first direction.

In the shown embodiment, the rollers 115 roll along the respective channels without sliding on the surface 107. In an alternative embodiment, the two rollers may simply be caused to slide fro and back along the channels.

It is pointed out that the roller drive device may be realized in several alternative ways. For example, the axle 117 may have a gear mounted thereto and be coupled to a drive gear, or to a toothed drive belt.

In use, the two rollers 115 are initially placed in a rest position, located for example at one end of the two ducts 101 or, alternatively, in intermediate position along the ducts 101. The fiber 111 is deployed, e.g. manually, gently lying it on the surface 107 of the bottom wall 105 of the ducts 101; in correspondence of the rollers 115, the fiber 111 is gently laid on the rollers 115 and remains slightly lifted with respect to the surface 107.

In general, the diameter of the two rollers 115 needs to be such that the bending induced on the fiber 111 by the lifting with respect to the surface 107 has a curvature radius sufficiently large not to affect the measurements to be conducted. As mentioned in the foregoing, the IEC standard prescribes a bending radius in excess of 15 cm. By way of example, the two rollers 115 may be two conventional bobbins normally used for spooling the optical fibers for, e.g., shipping it after production (shipping bobbins), that typically have a diameter of approximately 15 to 16 cm.

The fiber 111 is deployed having care to ensure that the fiber tension is substantially zero, not to affect the fiber mode coupling; for example, the fiber is deployed loosely, i.e. in a relaxed condition, on the surface 107. As a matter of fact, the only fiber sections which are subject to tensile stress are those which hang from the rollers 115, the tension being generated solely by the fiber weight. Assuming the rollers 115 have the diameter value described above (so as to fulfill the bending radius requirement), the fiber sections that hang from the rollers are approximately 1 m long; a typical optical fiber has a weight of roughly 0.1 grams/meter (possibly less); thus, assuming for simplicity that the fiber weight integrally translates into a longitudinal tensile force within the fiber, the fiber sections hanging from the rollers (the only fiber sections subject to tension) are subjected to a tensile stress of roughly 0.1 grams: this value is so low that the effects on the fiber mode coupling are negligible. It is also observed that although some fiber sections may overlay other fiber sections, the effect on the fiber mode coupling is negligible, thanks to the fact that the fiber is deployed loosely, at substantially zero tension (the underlying fiber sections merely experience the tiny weight of the overlying fiber sections).

As visible in FIG. 2, the two rollers 115 preferably have lateral flanges or shoulders 125, behaving as lateral containment flanks for the fiber sections 113a.

Figure 4:
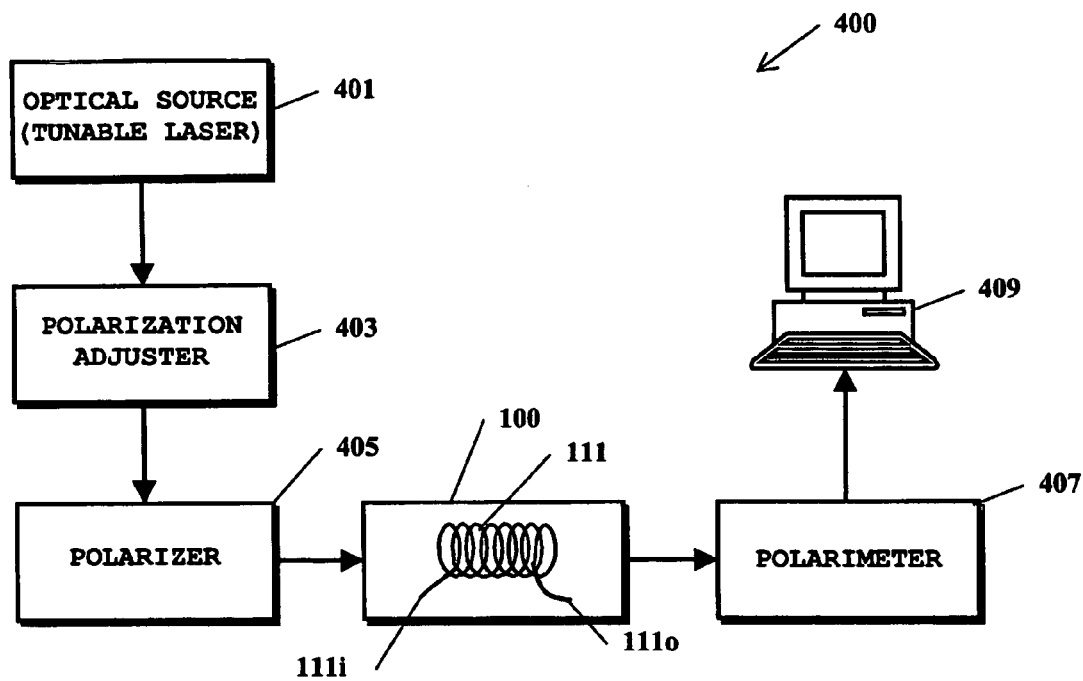
FIG. 4 schematically shows a measurement set-up for evaluating the PMD of an optical fiber according to the IEC standard, exploiting an apparatus according to the present invention for automatically inducing changes in the optical fiber mode coupling during the process of PMD evaluation, for example the apparatus of FIG. 1.

The apparatus shown in FIGS. 1, 2 and 3 is adapted to be used in a PMD evaluation set-up, depicted in an extremely schematic way in FIG. 4 and identified therein by 400, according to the prescriptions of the IEC standard; in particular, the PMD evaluation set-up 400 is of the type prescribed for evaluating the fiber PMD following the Method B referred to in the introductory part of the present description.

Without entering into details well known in the art, the set-up 400 comprises an optical source 401, a polarization adjuster 403 at the output of the optical source 401 and, downstream the polarization adjuster 403, a polarizer 405. The optical fiber 111 to be characterized is deployed in the apparatus 100 as described in the foregoing. Then, one end (the input end) 111i of the fiber 111 is connected to an output of the polarizer 405; an opposite end (the output end) 111o of the fiber is connected to a polarimeter 407. A computation unit 409, e.g. a personal computer, is associated with the polarimeter 407, for performing the calculations necessary to evaluate the optical fiber PMD from the measurement data.

Two kinds of light sources may be used, depending on the type of polarimeter a narrow band source such as a tunable laser can be used with a polarization analyzer; alternatively, a broadband source can be used with a narrow band pass filtering polarimeter such as an optical spectrum analyzer or an interferometer used as a Fourier transform spectrum analyzer placed before the polarimeter.

A DGD mean value is then determined according to the procedure set forth in the IEC standard. The optical source 401 scans the wavelengths across a range depending on an optical fiber operative wavelength region and on the desired precision of the measurement. The wavelength increment is chosen in dependence of the maximum DGD value. For each wavelength, the polarizer 405 cycles the three input polarizations between nominal 0°, 45° and 90°, and the data are recorded in three output vectors.

The measurement data are gathered for each wavelength, and mathematical calculations are performed. As a result, a series of DGD values versus wavelength is obtained.

Then, by means of the apparatus 100, a change is induced in the mode coupling of the optical fiber 111. To this purpose, the motor 121 is activated, and the rollers 115 are caused to move from, e.g., one end of the ducts 101 to the opposite end thereof, and then back to the initial position. The fro-and-back movement of the rollers 115 causes a sort of wave to propagate fro and back along the substantially rectilinear sections 113a of the optical fiber 111, as schematically shown in FIG. 3. Different portions of the rectilinear sections 113a of the fiber 111 in the two ducts 101 are thus lifted in succession with respect to the surface 107 of a height H, e.g., approximately 15 cm, and then smoothly lowered back onto the surface 107 as the rollers 115 move ahead or back in their fro-and-back movement along the ducts 101. The fiber 111 is lifted for spans Ls of approximately 1 m of length. At the end of this process, the lifting and lowering of the substantially rectilinear fiber sections 113a determines an overall change in the optical fiber deployment that modifies the fiber mode coupling. As already observed, the substantially rectilinear fiber sections 113a constitute the prevailing part of the optical fiber 111, thus the movement of the rollers 115 along the ducts 101 allows changing the deployment of a substantial part of the fiber 111 and the resulting modification of the fiber mode coupling is effective.

After having induced a change of the fiber mode coupling by means of the fro-and-back movement of the rollers 115 along the ducts 101, the DGD measurements are then repeated for this new optical fiber configuration. The whole process is iterated a prescribed number of times until sufficient data are gathered. The measurement procedure should be iterated until a good Maxwell distribution of DGD values is obtained. Since in a normalized Maxwell distribution the standard deviation $\sigma$ is proportional to the square root of the mean value μ, the higher the mean DGD value (corresponding by definition to the PMD) the wider the distribution. In particular, the ratio μ/σ is nearly equal to 2.37. A distribution of DGD measured values can be considered an acceptable approximation of the theoretical Maxwell distribution if the ratio μ/σ is comprised between 1.5 and 3. The number of DGD values needed to obtain a curve that is a good approximation of the Maxwell distribution depends on the PMD value. Since a typical wavelength range is about 100 nm, and a typically appropriated wavelength step is 10 nm, in a single measurement (after each induced change of the fiber mode coupling) ten DGD values are collected Typical fibers require about 300 DGD values, thus the measurement procedure shall be iterated approximately thirty times. The higher the number of repetitions, the higher the number of DGD data gathered for different optical fiber configurations, the better the distribution of the measured DGD values approaches a Maxwell curve of equation:

$$f(x) = \frac{2x^2}{\sigma^3 \sqrt{2\pi}} \exp\left[-\left(\frac{x^2}{2\sigma^2}\right)\right], \text{ for } x \geq 0.$$

where x identifies the measured DGD values, in picoseconds.

Then, calculations performed by the computation unit 409 allows determining the DGD expected value and, consequently, the fiber $PMD_c$ coefficient, given by:

$$PMD_c = \frac{1}{\sqrt{L}} \int_0^{+\infty} x f(x) dx$$

where L is the length of the optical fiber 111, length that shall be greater than 0.5 Km, to ensure the random mode coupling condition.

The apparatus 100 ensures that the PMD measurements are not affected by externally induced mode coupling, and allows easily modifying the mode coupling behavior of the optical fiber by changing the physical disposition thereof, without giving rise to intertwinings of the various fiber turns around each other; the fiber under evaluation, lying loosely on the deployment surface, is in a relaxed condition when the PMD measurements are made, and the fiber physical disposition change induces no torsions nor tensions in the fiber, which would alter the measurements because the evaluated PMD would stick to a value depending on that particular physical configuration of the fiber. Thus, the apparatus 100 allows repeatedly changing the optical fiber configuration without causing the fiber to tend to a stable physical configuration that would make, from that point on, the fiber configuration substantially invariable from the viewpoint of the PMD evaluation.

It is observed that, depending on the material (e.g., plastic) of which the rollers 115 are made, or on the material covering the active surface of the rollers, a more or less pronounced electro-static charging of the fiber 111 may take place. This effect can be expediently exploited in the apparatus 100, because thanks to the electro-static charge acquired, the different adjacent substantially rectilinear fiber sections 113*a* tend to repulse from each other; this mutual repulsion contributes to preventing the formation of fiber intertwinings. The lateral containment walls 109 of the ducts 101 and the roller flanks 125 ensure that the fiber remains within the ducts 101 even in presence of a certain level of electro-static repulsion. In any case, should the electro-static repulsive effect become too pronounced, with the risk that the fiber escapes from the ducts 101, an anti-static spray can be used to reduce the repulsion to acceptable levels.

Figure 5:
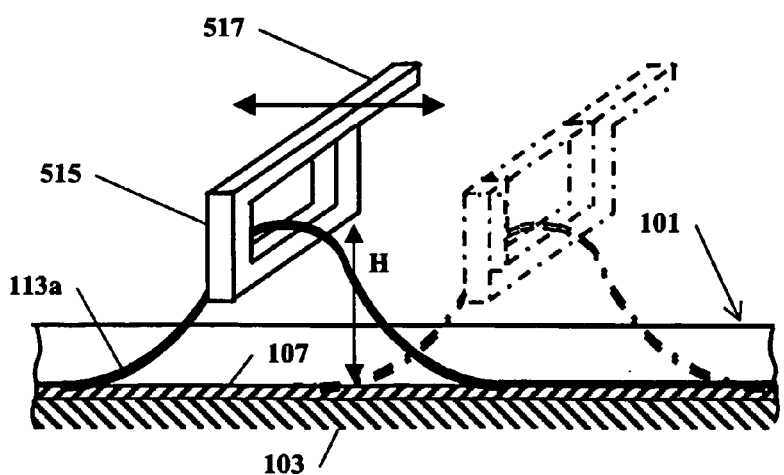
FIG. 5 schematically shows a detail of an apparatus according to a possible variant of the embodiment of FIG. 1.

In FIG. 5 a detail of an apparatus according to another embodiment of the present invention is schematically depicted. In this embodiment, the device for lifting the optical fiber with respect to the surface 107 comprises a bar 517 that, similarly to the axle 117 in the previous embodiment, extends transversally to the ducts 101. At each free end of the bar 517, a respective annular element 515 is provided, having an eye into which the fiber sections 113*a* are passed during the fiber deployment Thus, each annular element keeps a fiber span of length Ls of the substantially rectilinear fiber sections 113*a* lifted from the surface 107 of the bottom wall 105. A bar drive mechanism similar to that depicted in FIG. 1 is provided, for causing the bar 517 to move fro-and-back along the ducts 101, so as to cause the whole substantially rectilinear sections 113*a* of the optical fiber to be progressively lifted and laid back onto the surface 107. In principle, the optical fiber sections 113*a* could be simply placed over the bar 517, however the provision of the two annular elements 515 prevents that single optical fiber sections 113*a* slip down the bar. It is pointed out that the bar 517 or the annular elements 515 shall have a fiber abutment surface sufficiently large not to cause fiber bendings of to small curvature radii. Similar considerations on the substantially zero fiber tension as made in the foregoing apply as well to this embodiment of the invention.

It is pointed out that the invention embodiments described so far are susceptible of several modifications. For example, the provision of the two ducts 101 with lateral containment walls 109 is not to be construed as limitative, because only one duct of sufficient width might as well be used (the width of the duct being such that the curved fiber sections have sufficiently large bending radii). In this case, the two rollers may be substituted for by a single roller of sufficient width. The two ducts 101 (or, in the cited alternative, the single duct) might be formed by recessed channels in the support surface or floor 103. In another alternative embodiment, provided that the support surface or floor 103 is sufficiently smooth, the optical fiber could as well be placed directly on the support surface or floor, and no duct at all be provided; in this case, however, the electrostatic repulsion effect between the different fiber sections shall be tightly controlled. Also, between subsequent measurements, a simpler one-way movement of the rollers 115 from one end to the opposite end of the ducts 101 may be provided, instead of a fro-and-back movement, and even a partial movement of the rollers might be sufficient, without spanning the whole duct length.

The apparatus of FIG. 1, considered together with the variant of FIG. 5, gives an example of application of the principles of the present invention to an optical fiber PMD evaluation technique based on the floor test deployment of the fiber, involving a substantially rectilinear fiber deployment. The provision of the fiber lifting device realizes an apparatus that allows implementing a so-called statistical floor test deployment PMD evaluation.

As mentioned in the foregoing, the floor test deployment better matches the real-life operating conditions of an optical fiber (particularly, in-cable conditions), and the results of the PMD evaluation are thus more precise. However, the substantially rectilinear deployment of the optical fiber may result not perfectly suitable in view of an industrial application, mainly because a large area is required for carrying out the test (in the example mentioned in the foregoing, an area of approximately 10 m by 1 m is required only for the deployment of the fiber).

The space occupied could be reduced by deploying the fiber in circles, instead than in substantially rectilinear sections, as schematically depicted in FIG. 6: in this alternative embodiment of the present invention, globally identified by reference numeral 600, the two ducts 101 of the apparatus of FIG. 1 have been replaced by an annular channel 601, for example having a circular shape, having a bottom wall with a surface 607 of adequate smoothness (as prescribed by the IEC standard), on which the fiber 111 is laid, and two upstanding walls 609 for laterally containing the optical fiber 111.

In the shown embodiment, the fiber lifting device comprises a roller 615 made to run (or simply slide) along the channel 601 by a suitable drive mechanism, for example comprising a bar 617 connected to a motorized shaft 619 actuated by an, e.g., electric motor 621.

Similarly to the apparatus of FIG. 1, the movement of the roller 615 along the channel 601 causes a progressive lifting of arc-shaped fiber sections, and allows inducing changes in the fiber mode coupling between different measurement steps, that can be carried out with a set-up similar to the set-up 400 described in connection to FIG. 4. The roller 615 may for example be caused to make a complete turn along the channel 601 after every measurement step.

Similar considerations to those made in connection with the apparatus of FIG. 1 apply, particularly in respect of the substantially zero tension within the fiber under evaluation, and also in this case several modifications can be devised: for example, the physical provision of the channel 601 might be dispensed for, and the fiber 111 be loosely deployed directly on the support surface or floor (provided that the latter has a sufficient smoothness), approximately in circles, or the roller 615 might be replaced by alternative lifting means, for example of the type described in connection with FIG. 5.

The deployment of the fiber in rough circles instead than in substantially rectilinear sections allows reducing the area occupied by the PMD evaluation set-up; in particular, the area occupation largely depends on the diameter of the annular channel 601 (more generally, on the diameter of the circles by which the fiber is deployed). However, the effects of fiber bendings on the evaluated PMD need to be taken into account. The greater the curvature radius of the annular channel 601, the lower the influence of the fiber bending on the evaluated PMD, the better the results of the PMD evaluation procedure (in the sense that the PMD derived from the evaluation procedure more closely resembles the actual PMD that the optical fiber will exhibit on the field).

Adopting a configuration like the one depicted in FIG. 6, the Applicant performed, on different optical fibers, repeated PMD evaluation procedures, varying from time to time the diameter of the channel 601, i.e. the curvature radius of the deployed fiber.

In particular, two different types of optical fibers have been tested: a spun fiber and an unspun fiber. Differently from their unspun counterparts, spun optical fibers are obtained by applying a torque to the fiber during the fiber drawing process. Said torque causes the fiber to undergo rotation around its longitudinal axes, with a resulting torsional deformation of the fiber material in the hot zone. This deformation is then frozen into the fiber so that it exhibits a permanent "spin", that is, a permanent torsional deformation. Fiber spinning is a consolidated technique to reduce PMD of a fiber.

For each fiber, the fiber PMD has been evaluated performing repeated DGD measurements as discussed in the foregoing, changing the fiber mode coupling behavior after each measurement by means of the fiber lifting device. Additionally, for each fiber, the effects of the fiber curvature radius on the evaluated PMD have been investigated by repeating PMD evaluation procedures with annular channels 601 of different diameter.

Figure 7A:
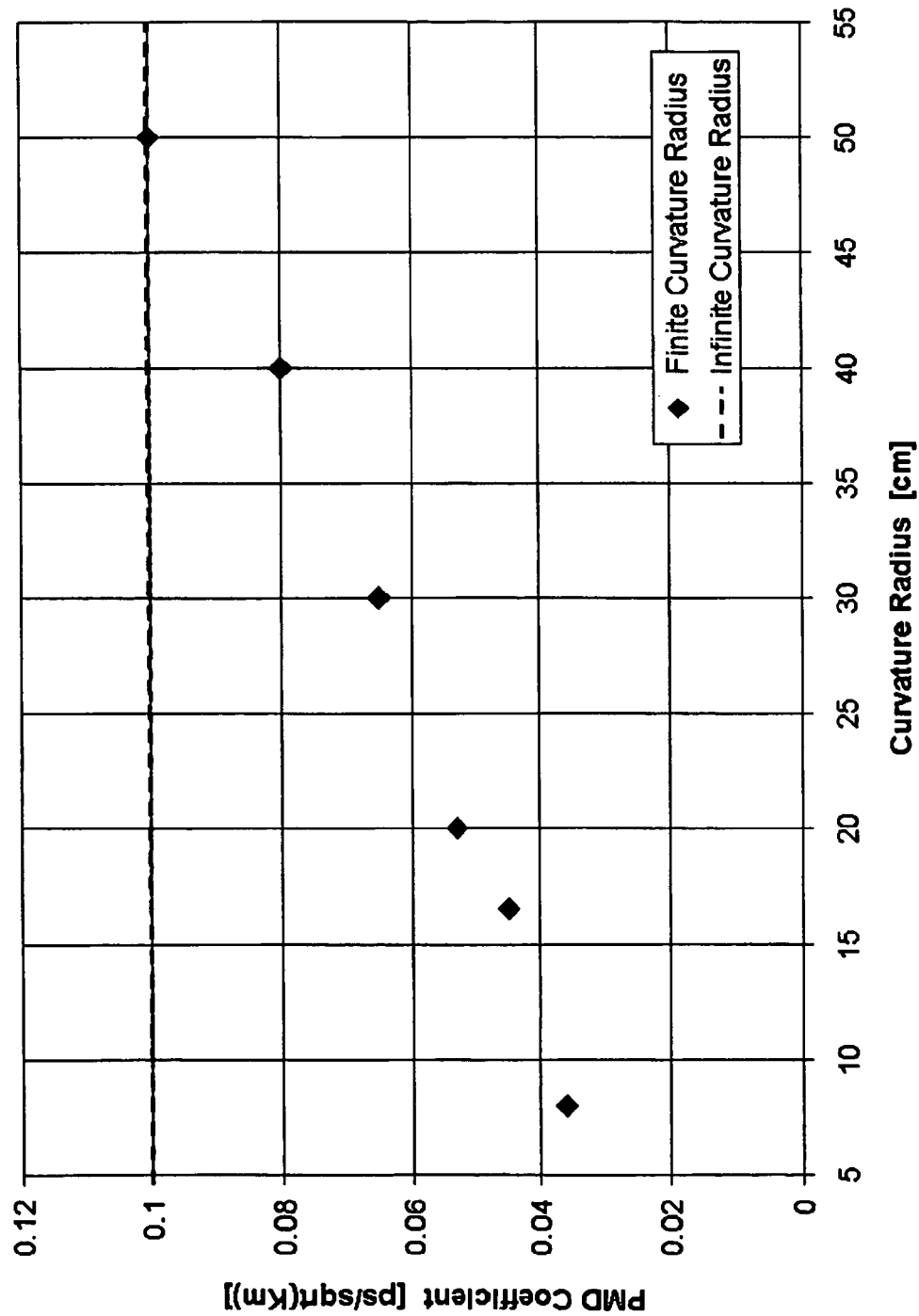
FIGS. 7A and 7B are two diagrams reporting the results of PMD evaluation trials conducted by the Applicant on a spun and an unspun optical fibers, exploiting an apparatus similar to that of FIG. 6, varying the curvature radii of the deployed fibers.
Figure 7B:
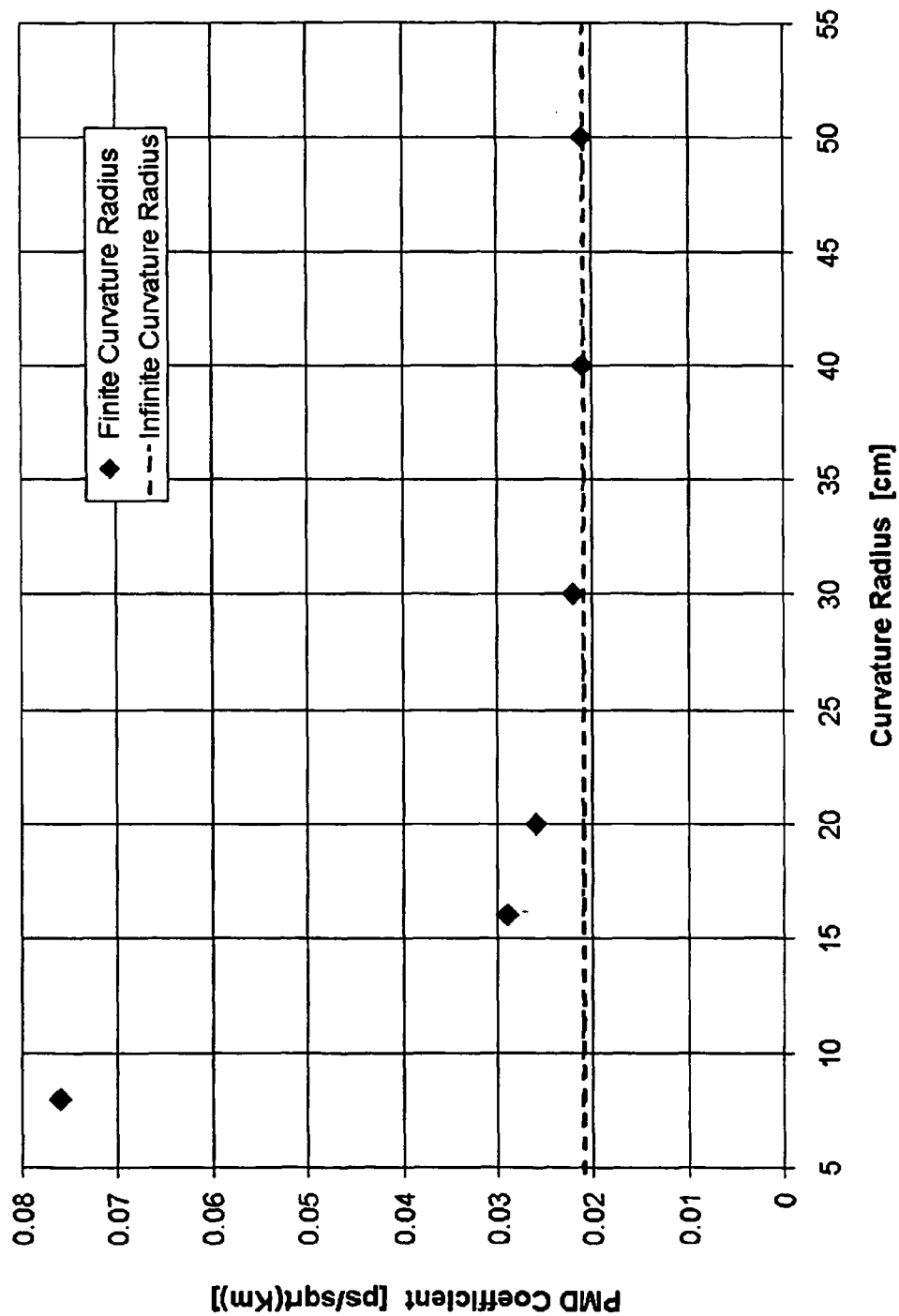

The Applicant has found that the evaluated PMD strongly depends on the curvature radius of the optical fiber under evaluation, and that optical fibers of the spun type exhibits an opposite behavior, as far as the effects of fiber bending on the evaluated PMD are concerned, compared to the unspun fibers, as reported in the two diagrams of FIGS. 7A and 7B. In these diagrams, the fiber $PMD_c$ coefficients evaluated for fiber curvature radii equal to approximately 8 cm, 16.5 cm, 20 cm, 30 cm, 40 cm and 50 cm are reported (the dots in the diagrams), together with the $PMD_c$ coefficient evaluated for the same fiber adopting the apparatus of FIG. 1, providing for a substantially rectilinear deployment of the fiber (a dashed line in each diagram).

In particular, in both cases the evaluated $PMD_c$ coefficient asymptotically tends to the coefficient $PMD_c$ which is evaluated in the case of the substantially rectilinear deployment, obtained adopting the apparatus of FIG. 1. However, while in the case of the unspun fiber (FIG. 7A) the evaluated $PMD_c$ decreases with the decrease of the fiber bending radius, in the case of the spun fiber (FIG. 7B) the evaluated $PMD_c$ increases as the fiber bending radius decreases. Also, from the two diagrams it can be desumed that while for the spun fiber the asymptotic $PMD_c$ value is reached relatively quickly (the asymptotic $PMD_c$ value is already reached for a curvature radius of approximately 30 cm), the unspun fiber only reaches the asymptotic $PMD_c$ value after the bending radius is increased to approximately 50 cm.

Figure 7C:
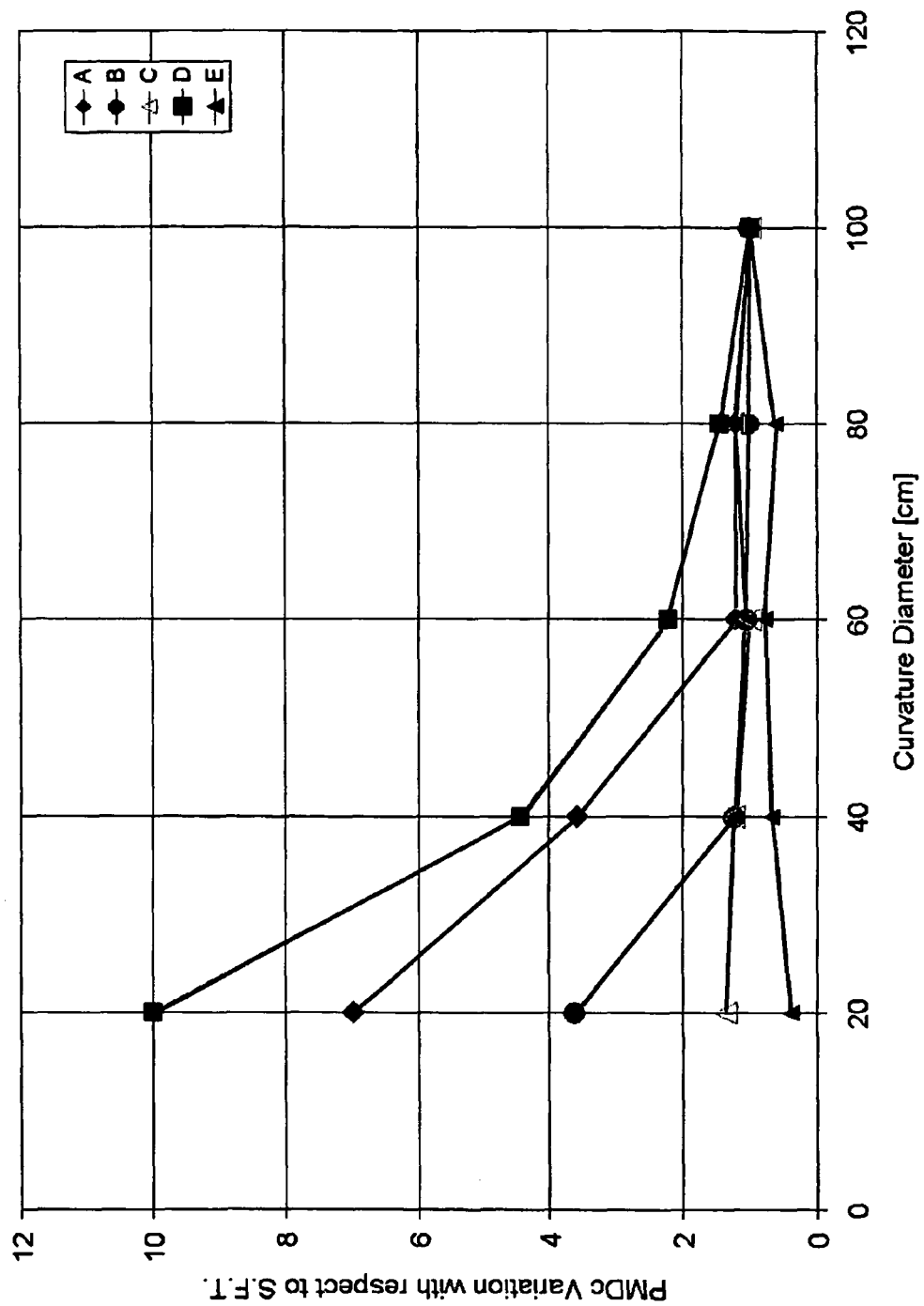
FIG. 7C is a diagram showing the variation with the fiber deployment curvature diameter of the coefficient $PMD_c$ (normalized to the coefficient $PMD_c$ obtained using, e.g., the apparatus of FIG. 1) of five different fibers.

FIG. 7C reports the results of $PMD_c$ evaluation procedures carried out on five different optical fibers, particularly step-index, single-mode fibers complying to the standard ITUT G.652 and commercially considered equivalent to each other, in this diagram, for each fiber the coefficient $PMD_c$ evaluated for deployments of variable curvature diameter (20 cm, 40 cm, 60 cm, 80 cm, 100 cm) is reported (the $PMD_c$ values being normalized for each fiber to the $PMD_c$ value that is evaluated for that fiber adopting the substantially rectilinear fiber deployment allowed by, e.g., the apparatus 100 of FIG. 1). It can be appreciated that for all the five fibers tested, a deployment involving a fiber bending diameter of approximately 100 cm gives a $PMD_c$ close to the one evaluated adopting a substantially rectilinear deployment Remarkably, for two of the tested fibers (D and A), a relatively dramatic deviation of the $PMD_c$ coefficient evaluated in the case of a fiber deployment involving a fiber bending diameter less than approximately 60 cm from the $PMD_c$ coefficient evaluated for a substantially rectilinear deployment is experienced.

The Applicant has therefore observed that, in order to render the evaluated PMD not affected by the fiber bending (thereby increasing the precision of the PMD evaluation procedures and the measurements reliability irrespective of the fiber characteristics), a relatively large fiber bending radius, at least approximately 30 cm, is needed (corresponding to a curvature diameter of approximately 60 cm); in other words, the minimum bending radius of 15 cm prescribed by the IEC standard is actually not sufficient for ensuring that the evaluated PMD is not affected by effects due to the fiber bending. In particular, performing the evaluation of the PMD on a fiber deployed in such a way that the bending radius is of the order of 15 cm, as prescribed by the IEC standard, causes, in the case of an unspun fiber, an underestimation of the actual PMD exhibited on field, with the consequence that a fiber may be erroneously declared as complying with prescribed data transmission rate characteristics while it is not; conversely, in the case of a spun fiber, the PMD would be overestimated (meaning that some fibers might be discarded as non-compliant to specified ratings, while they would instead be perfectly complying).

Thus, the Applicant has found that, in order to obtain evaluated fiber PMDs that do not depend on spurious effects due to the fiber bending, it is necessary to deploy the fiber in circles having sufficiently large diameters, and, preferably, greater than 60 cm, so that the evaluated PMD is not affected by fiber bending effects irrespective of the type of fiber (spun and unspun).

It is pointed out that this remarkable result has been achieved thank to the fact that, according to the present invention, the Applicant has firstly devised a procedure for precisely estimating the fiber PMD, by performing a real statistical floor test deployment evaluation of the fiber PMD, wherein the fiber placement is such as to ensure that the externally induced mode coupling is minimized, and automatically induced changes of the mode coupling of the fiber have been made. In particular, in the case of a substantially rectilinear fiber deployment, this procedure allows achieving a very precise estimation of the fiber PMD, very close to the real-life fiber PMD, to be used as a reference value, and also to obtain very precise PMD estimations even when different fiber deployments are adopted.

In the following, alternative embodiments of the present invention are discussed that allow applying the principles of the present invention to an improved low-tension bobbin fiber deployment, taking into account the results of the above discussion, so as to achieve relatively precise estimations of the fiber PMD in a way more practical in view of an industrial application.

Figure 8A:
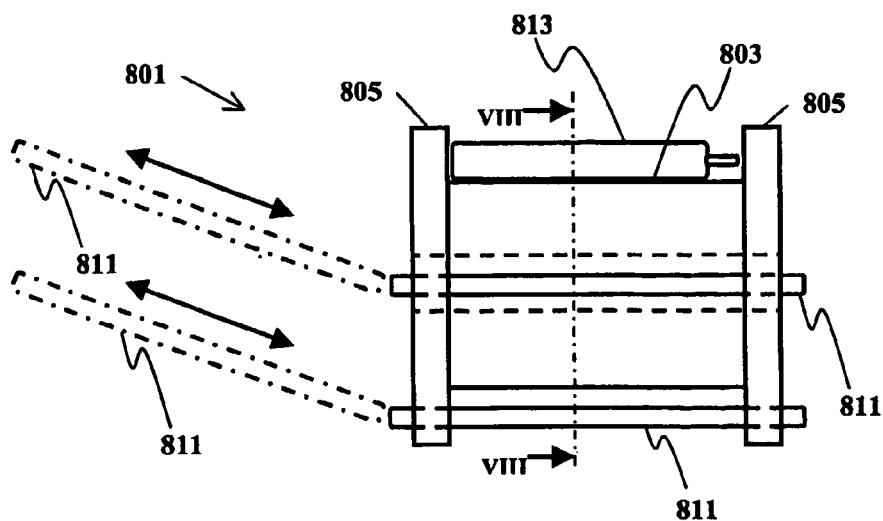

In particular, in the embodiment schematically shown in FIGS. 8A, 8B and 8C, a bobbin 801 is provided on which an optical fiber to be characterized can be spooled. The bobbin 801 comprises a cylindrical bobbin body 803, having a diameter of at least approximately 60 cm, and two flanges 805 at the two bases of the cylindrical bobbin body 803, of diameter larger than the bobbin body 803. In each flange 805, a plurality of pass-through holes 809 of suitable diameter (for example, slightly larger than 2 cm) are preferably regularly distributed in circumferential succession at a prescribed radial distance from a longitudinal axis of the bobbin body 803 (in the shown example, three holes). The pass-though holes 809 in the two flanges 805 are axially aligned, so as to be capable of receiving rods 811; each rod 811 can be slipped into and off a pair of axially-aligned, facing holes 809 in the two opposite flanges 805, so as to extend axially to the body 803 at a predetermined distance from the external surface thereof; for example, the rods may have a diameter of approximately 2 cm, and extend at a distance of approximately 3 cm from the external surface of the bobbin body. A roller 813 is provided, adapted to, e.g., roll around the external surface of the bobbin body 803 under the action of a suitable drive mechanism, an example of which is schematically depicted in FIGS. 11A and 11B and will be described later on.

Before the optical fiber to be characterized is wound onto the bobbin 801, the rods 811 are inserted into the holes 809. In this way, a fictitious increment of the diameter of the bobbin body 803 is achieved; for example, the diameter of the bobbin body may be increased of about 10%. When the bobbin is equipped with the rods, a fiber spooling surface results that, although not exactly cylindrical, is generically cylindrical. However, the higher the number of the rods 811, the closest the surface defined by the envelope of the rods approximates a regular cylindrical surface.

Then, the optical fiber 111 to be characterized is spooled onto the bobbin 801 equipped with the rods 811 and thus having an increased diameter compared to the bobbin body diameter, as schematically depicted in FIG. 9. This operation can be performed using a conventional spooling machine, of the type normally used for spooling the fibers onto the shipping bobbins before shipping; in the spooling phase, no particular care needs to be taken for ensuring that the fiber is spooled with low tension (the fiber will be rendered loose in a subsequent phase, as described afterwards), so the spooling process can be rather fast.

With reference to FIG. 10, after the fiber 111 has been wound onto the bobbin 801, the rods 811 are slipped off the holes 809. In this way, the fiber 111 remains loosely wound around the bobbin body, in a relaxed condition (it is pointed out that in this drawing the fiber loosening effect caused by the rod removal is greatly exaggerated).

Then, the bobbin 801 with the loosely wound fiber 111 is mounted to a fiber moving (lifting) device 1100, schematically depicted in FIGS. 11A and 11B. The device 1100 comprises an upstanding panel 1101, provided with a chuck 1103 adapted to engage a central hole 821 provided in the bobbin body. A barrel 1105 is also provided, with a central hole adapted to receiving an end of a crank 1113 whose other end is coupled to a tang of the roller 813, and mounted on a plate 1107 rotatably mounted to the panel 1101 and actuated by a motor 1109 so as to rotate in the plane of the panel 1101.

The two ends 111$i$ and 111$o$ of the fiber 111 are connected to the polarizer 405 and the polarimeter 409 of the measurement set-up 400 of FIG. 4, and the PMD evaluation procedure is started. DGD values are gathered are prescribed by the IEC standard.

After each set of DGD values gathered by repeating measures with the fiber in a same physical disposition, an automatical change of the mode coupling of the fiber 111 is induced by making the roller 813 revolve around the bobbin body longitudinal axis. For example, the roller 813 is caused to make a complete revolution around the bobbin body axis; to this end, the motor 1121 is activated and causes the plate 1107 to rotate, thereby the barrel 1105 transmits the rotational movement to the crank 1113, which causes the roller 813 to roll around the external surface of the bobbin body 803. Thanks to the looseness of the fiber 111, as the roller 813 revolves around the bobbin body longitudinal axis, different portions of the fiber 111 are moved far from and then brought back to a position closer to the longitudinal axis of the bobbin body; in other words, different portions of the fiber 111 are progressively lifted and then lowered back in succession with respect to an ideal surface on which the fiber 111 lies in rest condition; similarly to what happened in the apparatus of FIG. 1, a wave propagates along the fiber. The physical disposition of the fiber 111 is thus varied, and the mode coupling behavior of the fiber is changed.

It is observed that, after the fiber 111 is rendered loose around the bobbin body by removing the rods 811, the fiber tension is substantially zero, so as not to affect the fiber mode coupling. Similarly to the floor-test deployment of, e.g., FIG. 1, the only fiber sections which are subject to tensile stress are those hanging from the bobbin body at the bottom thereof, the tension being generated solely by the fiber weight. Assuming for example that the bobbin body circumference is of approximately 3 m, the hanging fiber sections are approximately 1.5 m long; with a typical optical fiber has a weight of roughly 0.1 grams/meter (possibly less), and assuming for simplicity that the fiber weight integrally translates into a longitudinal tensile force within the fiber, the fiber sections hanging from the bobbin body are subjected to a tensile stress of roughly 0.15 grams: this value is so low that the effects on the fiber mode coupling are negligible. It is also observed that although some fiber sections overlay other fiber sections, the effect on the fiber mode coupling is negligible, thanks to the fact that the fiber is loose around the bobbin body, at substantially zero tension (the underlying fiber sections merely experience the tiny weight of the overlying fiber sections).

In this way, a substantially zero-tension bobbin deployment PMD evaluation method is implemented, which is adapted to account for the statistical nature of the PMD. A rather precise evaluation of the fiber PMD is thus achieved.

It is observed that also this embodiment of the invention is susceptible of several modifications. For example, instead of providing the motor 1121, a hand-driven transmission mechanism may be provided. Also, fiber spooling bobbins having fiber spooling surfaces that are not cylindrical nor generically cylindrical can be used.

Figure 12:
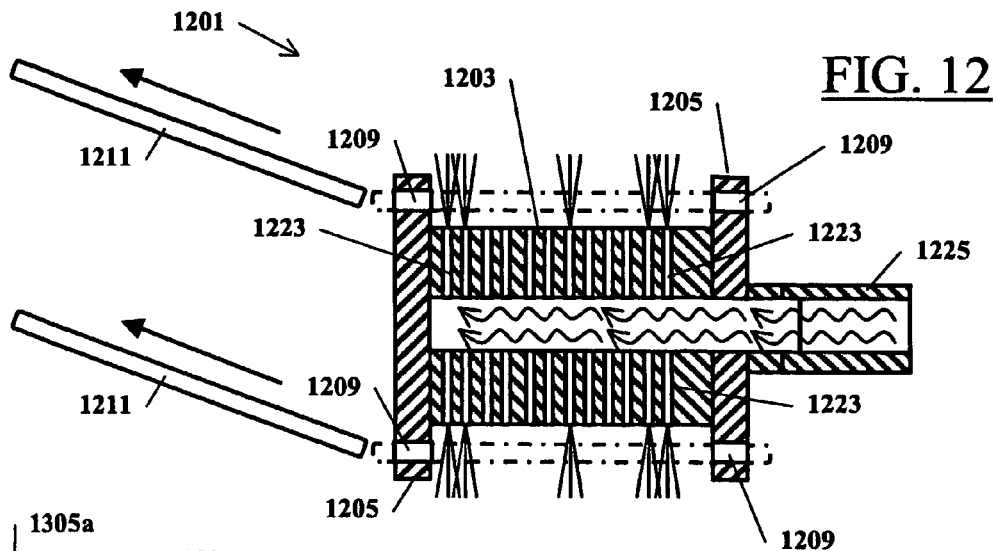
FIG. 12 schematically depicts, in axial sectional view, another embodiment of a variable-diameter bobbin, adapted to be used in a substantially zero-tension bobbin deployment PMD evaluation method according to an alternative embodiment of the present invention.

FIG. 12 schematically shows a variable-diameter spooling bobbin 1201 according to a different embodiment. Similarly to the previous embodiment, the bobbin 1201 comprises a cylindrical bobbin body 1203, having a diameter of at least approximately 60 cm, and two flanges 1205 at the two bases of the cylindrical bobbin body 1203, of diameter larger than the bobbin body 1203. In each flange 1205, a preferably regular circumferential distribution of axially-aligned pass-through holes 1209 is formed, at a prescribed radial distance from a longitudinal axis of the bobbin body. The axially-aligned pass-though holes 1209 are adapted to slidably receiving rods 1211; each rod 1211 can be slipped into and off a respective pair of facing holes 1209 in the two opposite flanges 1205, so as to extend axially to the bobbin body 1203 at a predetermined distance from the external surface thereof (dimensions similar to those cited in relation to the previous embodiment are for example suitable).

The bobbin body 1203 is internally hollow, and a plurality of small pass-through channels 1223 are provided which extends radially through the bobbin body.

Similarly to the variable-diameter bobbin of the previous embodiment, the fiber to be characterized is spooled on the bobbin 1201 with the rods 1211 in place, so that the diameter of the bobbin body is fictitiously increased. In this way, no particular care needs to be taken in the fiber spooling procedure in order to ensure that the fiber tension is adequately low.

Then, all or only some of the rods 1211 are removed, slipping them off the respective pair of axially-aligned holes. The fiber to be characterized is thus rendered loosely wound around the bobbin body (also in this case, the tension within the fiber after it has been rendered loosely wound is substantially zero, negligibly influencing the fiber mode coupling, and only depends on the fiber weight).

The two fiber ends are connected to the polarizer and the polarimeter, and DGD measurements are gathered as described in the foregoing.

In order to change the fiber mode coupling, a flow of a suitably pressurized fluid, for example pressurized air, is fed to the central bore of the bobbin body 1203, by connecting thereto a duct 1225. The pressured fluid, exiting through the channels 1223, causes the fiber physical disposition to vary; in particular, the fiber is caused to be randomly lifted and then lowered back with respect to the surface of the bobbin body.

Figure 13A:
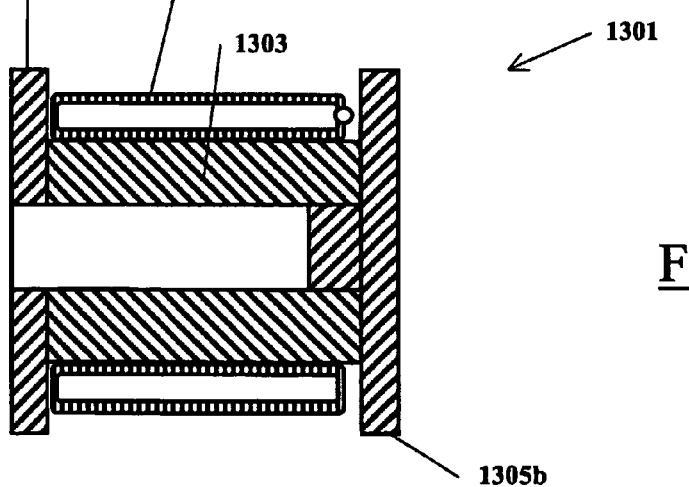
FIGS. 13A and 13B schematically depict, in axial sectional view, still another embodiment of a variable diameter bobbin adapted to be used in a substantially zero-tension bobbin deployment PMD evaluation method according to still another embodiment of the present invention.
Figure 13B:
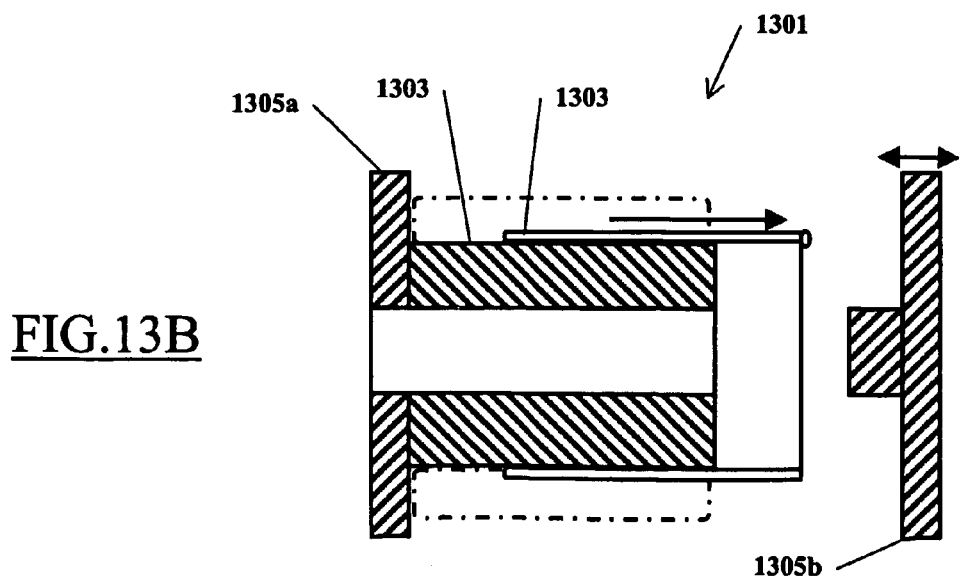

Finally, FIGS. 13A and 13B schematically show a variable-diameter spooling bobbin 1301 according to still another embodiment of the present invention. Similarly to the previous embodiments, the bobbin 1301 comprises a cylindrical bobbin body 1303, having a diameter of at least approximately 60 cm, and two flanges 1305a, 1305b at the two bases of the cylindrical bobbin body 1303, of diameter larger than the bobbin body 1303.

One 1305b of the two flanges 1305a, 1305b is removable from the bobbin body 1303, so as to enable an inflatable/deflatable toroidal cushion 1327 to be slipped on and off the bobbin body 1303.

In order to fictitiously increase the diameter of the bobbin body 1303, the toroidal cushion 1327 is initially inflated with a suitable gas or fluid, e.g. air; in this way, the apparent diameter of the bobbin body is increased. Then, a fiber to be characterized is spooled on the bobbin 1301, again without the necessity of putting particular care for ensuring that the fiber tension is adequately low. Then, the toroidal cushion is deflated, so as to reduce the diameter thereof. The flange 1305b is dismounted from the bobbin body, and the cushion 1327 is slipped off. In this way, the fiber is rendered loosely wound on the bobbin body.

A fiber lifting device similar to the revolving roller shown in FIG. 11A, caused to move manually or by means of an apparatus similar to that shown in FIGS. 11A and 11B may be exploited for lifting the fiber so as to induce the desired change of mode coupling.

The embodiments described in connection with FIGS. 8A, 8B and 8C, 12 and 13A, 13B provide variable-diameter bobbins adapted to be used in the context of a statistical substantially zero-tension bobbin deployment PMD evaluation method according to an embodiment of the present invention, wherein the mode coupling of the fiber under evaluation is not externally perturbed, e.g. by tensile stresses, and an automatic change of the fiber mode coupling is foreseen. In particular, all these variable-diameter bobbins are adapted to easily rendering the spooled fiber loose, relaxed, thus allowing an automatic mechanical rearrangement thereof. However, although an automatic fiber physical disposition modification is preferred, nothing prevents from using the variable-diameter bobbins according to the present invention in a manual fiber physical disposition modification context, for example by massaging the loosened optical fiber. Generally speaking, the provision of a variable-diameter fiber spooling bobbin makes it easier to spool the fiber to be characterized, because there is no need to carefully control the fiber spooling process so as to ensure that the fiber tension is adequately low.

It is pointed out that the embodiments of the invention described in the foregoing are merely exemplary and not at all limitative: several other embodiments are conceivable which are suitable for the purpose of changing the mode coupling behavior of the fiber under evaluation. For example, the fiber mechanical lifting action that, in the embodiment of FIG. 1, is performed by, e.g., the rollers 115, might as well be obtained using a properly pressurized flow of a suitable fluid, such as air, similarly to the embodiment of FIG. 12, or by providing the bottom wall 105 of the ducts 101 with tiles that can be selectively lifted and lowered back.

The methods described in the foregoing are particularly adapted to fully characterize, with a high degree of precision, the PMD of a single optical fiber. However, having found that if the diameter of the bobbin used for spooling the fiber is larger than approximately 60 cm the intrinsic fiber birefringence is not altered, and thus a single fiber configuration provides a set of DGD measured values compatible with the accurate, Maxwell DGD distribution, the Applicant has found that, for industrial characterization purposes, it might be sufficient to perform one single measurement per produced fiber, or even one single measurement per lot of produced fibers (deployed at low tension over a bobbin of conveniently large diameter, larger than approximately 60 cm, for example exploiting a variable-diameter bobbin of one of the types described in the foregoing), without repeating the measurements after inducing changes to the fiber mode coupling. For example, one single measurement for a single one of the optical fibers produced from a same fiber preform may performed, and the evaluated PMD be assumed to characterize all the optical fibers produced from that preform (provided that the preform may be assumed to be relatively uniform). In this way, the PMD distribution of a population of fibers is measured, and an entire production process can be characterized from the PMD viewpoint.

The invention claimed is:

1. A method of evaluating Polarization Mode Dispersion (PMD) of an optical fiber, comprising:
    arranging the optical fiber on a surface at substantially zero tension, in a relaxed, unstressed condition;
    propagating prescribed evaluation optical signals along the optical fiber;
    measuring fiber Differential Group Delay (DGD) values in response to said evaluation optical signals;
    repeating at least once said acts of propagating and measuring, each time preliminarily inducing a change in a mode coupling of the fiber; and
    determining the fiber PMD on the basis of a calculated DGD average value, said inducing a change in the polarization mode coupling of the fiber comprising:
    moving at least a section of the fiber substantially orthogonally to the surface.

2. The method according to claim 1, wherein said arranging the optical fiber at substantially zero tension on a surface comprises arranging the fiber on the surface at a tension equal to or less than approximately 20 grams.

3. The method according to claim 1, wherein said arranging the optical fiber at substantially zero tension on a surface comprises arranging the fiber on the surface at a tension equal to or less than approximately 10 grams.

4. The method according to claim 1, wherein said arranging the optical fiber at substantially zero tension on a surface comprises arranging the fiber on the surface at a tension equal to or less than 0.15 gram.

5. The method according to claim 1, wherein said at least a section of the fiber which is moved substantially orthogonally to the surface is variable along the fiber.

6. The method according to claim 5, wherein said surface is a substantially planar surface.

7. The method according to claim 6, wherein said arranging the optical fiber on a surface comprises arranging the fiber in a plurality of substantially rectilinear fiber sections joined by at least partially curved fiber sections having a curvature radii higher than a minimum curvature radii, an overall length of the substantially rectilinear sections being substantially higher than an overall length of the at least partially curved fiber sections.

8. The method according to claim 7, wherein said arranging the fiber in a plurality of substantially rectilinear fiber sections comprises arranging the fiber on the surface in a generally "0" shaped arrangement, with two laterally-spaced arrangements of substantially-rectilinear fiber sections.

9. The method according to claim 8, wherein said moving the at least a section of the fiber substantially orthogonally to the surface comprises lifting at least a portion of at least a group of the substantially rectilinear fiber sections with respect to the surface, and lowering the lifted portion back.

10. The method according to claim 9, comprising lifting and lowering back in succession consecutive spans of the substantially-rectilinear fiber sections in at least one of the two laterally-spaced arrangements of substantially rectilinear fiber sections.

11. The method according to claim 6, wherein said arranging the optical fiber on a surface comprises arranging the fiber in circles having a curvature radii higher than a minimum curvature radii.

12. The method according to claim 5, wherein said surface is curved and has a radial dimension of at least approximately 30 cm.

13. The method according to claim 12, wherein said surface is a generically cylindrical surface.

14. The method according to claim 12, wherein said arranging the optical fiber on a surface comprises:
    providing a bobbin with a fiber spooling surface having a radial dimension variable in a controlled way between a first, greater radial dimension and a second, lower radial dimension;
    spooling the fiber on the bobbin while the spooling surface has the first radial dimension; and
    reducing the radial dimension of the spooling surface to the second diameter, so that the fiber is rendered loose.

15. An apparatus for automatically including changes in a polarization mode coupling of an optical fiber, comprising:
    a fiber arrangement surface adapted to have a fiber under test arranged thereon and in contact therewith at substantially zero tension, in a relaxed, unstressed condition, and
    operatively associated with the fiber arrangement surface, a fiber moving device activatable for moving at least a section of the fiber substantially orthogonally to the fiber arrangement surface.

16. The apparatus according to claim 15, wherein said fiber arrangement surface is adapted to have a fiber under test arranged thereon at a tension equal to or less than approximately 20 grams.

17. The apparatus according to claim 15, wherein said fiber arrangement surface is adapted to have a fiber under test arranged thereon at a tension equal to or less than approximately 10 grams.

18. The apparatus according to claim 15, wherein said fiber arrangement surface is adapted to have a fiber under test arranged thereon at a tension equal to or less than 0.15 grams.

19. The apparatus according to claim 15, wherein said fiber moving device comprises a fiber moving member movable with respect to the fiber arrangement surface for moving sections of the fiber in variable positions along the fiber.

20. The apparatus according to claim 19, wherein said fiber moving member is adapted to move in succession different sections of the fiber.

21. The apparatus according to claim 19, wherein said fiber arrangement surface is a substantially planar surface.

22. The apparatus according to claim 21, wherein said fiber moving member is adapted to lift the at least a section of the fiber with respect to the fiber arrangement surface, and to lower the lifted fiber section back.

23. The apparatus according to claim 19, wherein said fiber arrangement surface is curved and has a radial dimension of at least approximately 30 cm.

24. The apparatus according to claim 23, wherein said fiber arrangement surface is a generically cylindrical surface.

25. The apparatus according to claim 23, comprising a bobbin with a fiber spooling surface having a radial dimension variable in a controlled way between a first, greater radial dimension and a second, lower radial dimension, a difference between the first radial dimension and the second radial dimension being such that a reduction of radial dimension to be rendered sufficiently loose for enabling the fiber moving arrangement to move the at least a section of the fiber.

26. An apparatus for evaluating the Polarization Mode Dispersion (PMD) of an optical fiber, comprising the apparatus for automatically inducing changes in a polarization mode coupling of the fiber according to claim 15.

* * * * *